US008654655B2

(12) United States Patent
Silveira Filho et al.

(10) Patent No.: US 8,654,655 B2
(45) Date of Patent: Feb. 18, 2014

(54) DETECTING AND CLASSIFYING ANOMALIES IN COMMUNICATION NETWORKS

(75) Inventors: Fernando Jorge Silveira Filho, Vanves (FR); Christophe Diot, Paris (FR)

(73) Assignee: Thomson Licensing, Issy Les Moulineaux (FR)

( * ) Notice: Subject to any disclaimer, the term of this patent is extended or adjusted under 35 U.S.C. 154(b) by 202 days.

(21) Appl. No.: 12/928,526

(22) Filed: Dec. 14, 2010

(65) Prior Publication Data

US 2011/0149745 A1 Jun. 23, 2011

(30) Foreign Application Priority Data

Dec. 17, 2009 (EP) .................................... 09306253

(51) Int. Cl.
*H04L 1/00* (2006.01)
(52) U.S. Cl.
USPC ............. 370/244; 370/242; 709/224; 726/22; 726/23
(58) Field of Classification Search
None
See application file for complete search history.

(56) References Cited

U.S. PATENT DOCUMENTS

| 7,424,619 | B1 * | 9/2008 | Fan et al. | 713/188 |
|---|---|---|---|---|
| 7,458,098 | B2 * | 11/2008 | Judge et al. | 726/23 |
| 7,792,770 | B1 * | 9/2010 | Phoha et al. | 706/45 |
| 8,381,299 | B2 * | 2/2013 | Stolfo et al. | 726/24 |
| 2002/0032717 | A1 * | 3/2002 | Malan et al. | 709/105 |
| 2004/0025044 | A1 | 2/2004 | Day | |
| 2005/0022008 | A1 * | 1/2005 | Goodman et al. | 713/201 |
| 2005/0044406 | A1 * | 2/2005 | Stute | 713/201 |
| 2007/0121596 | A1 * | 5/2007 | Kurapati et al. | 370/356 |
| 2008/0163333 | A1 * | 7/2008 | Kasralikar | 726/1 |
| 2008/0170501 | A1 * | 7/2008 | Patel et al. | 370/235 |
| 2010/0284282 | A1 * | 11/2010 | Golic | 370/242 |
| 2010/0284288 | A1 * | 11/2010 | Lee et al. | 370/252 |

OTHER PUBLICATIONS

Chatzis, Nikolaos, "Similarity Search over DNS Query Streams for Email Worm Detection", 2009 IEEE International Conference on Advanced Information Networking and Applications, Piscataway, NJ, May 26, 2009, pp. 588-595.

Marimuthu, A., "Intelligent Progression for Anomaly Intrusion Detection",2008 IEEE 6th International Symposium on Applied Machine Intelligence and Informatics, Piscataway, NJ, Jan. 21, 2008, pp. 261-265.

* cited by examiner

*Primary Examiner* — Donald Mills
(74) *Attorney, Agent, or Firm* — Tutunjian & Bitetto, P.C.

(57) ABSTRACT

The invention relates to a method of detecting an anomaly in traffic containing a plurality of flows. Each flow has a plurality of flow features. The method including the steps of: (i) dividing the traffic into a plurality of sets, on the basis a first flow feature, such that the flows in at least one of the sets have a common value for the first flow feature (ii) determining that the anomaly is present in one of the sets and, (iii) dividing the set in which the anomaly is present on the basis of a second flow feature, such that the flows in at least one of the resulting sets have a common value for the second flow feature.

15 Claims, 2 Drawing Sheets

(a) correct classification    (b) incorrect classification    (c) ambiguous classification

DETECTING AND CLASSIFYING ANOMALIES IN COMMUNICATION NETWORKS

This application claims the benefit, under 35 U.S.C. §119 of European Patent Application 09306253.7, filed Dec. 17, 2009.

FIELD OF THE INVENTION

The present invention relates to the field of communication networks, in particular to the identification of traffic.

BACKGROUND OF THE INVENTION

Several traffic anomaly detection methods have been proposed in the prior art:

Lakhina, M. Crovella, and C. Diot, "*Mining anomalies using traffic feature distributions*", in Proceedings of SIGCOMM, August 2005;

A. Soule, K. Salamatian, and N. Taft, "*Combining filtering and statistical methods for anomaly detection*", in Proceedings of IMC, October 2005;

X. Li, F. Bian, M. Crovella, C. Diot, R. Govindan, G. Iannaccone, and A. Lakhina, "*Detection and identification of network anomalies using sketch subspaces*", in Proceedings of IMC, October 2006; and F. Silveira, C. Diot, N. Taft, and R. Govindan, "*Detecting correlated anomalous flows*", Thomson, Tech. Rep. CR-PRL-2009-02-0001, January 2009;

and some techniques are now part of commercial products (Guavus NetReflex—http://www.quavus.com and Arbor Networks Peakflow—http://www.arbornetworks.com).

These methods have in common the ability to flag alarms for a variety of events that may be important to a network operations center (NOC) including attacks, flash crowds, link failures, and routing outages.

Once an alarm is raised, root cause analysis can be performed to know how to address the problem. Root cause analysis is usually left to network operators, who use their knowledge and intuition to analyze the traffic trace where the anomaly was flagged in search of events that can explain it. This manual process is both time-consuming and error prone. In a large ISP network with hundreds of links, the number of events that can trigger alarms may easily overload the NOC. Under such circumstances, the operator is likely to ignore alarms or never even deploy the detection system in the first place.

The root cause analysis problem involves two tasks: (1) identifying the traffic involved in the anomaly, and (2) classifying the anomaly according to the type of event that cause it (e.g., DoS attack, port scan, link failure).

Previous works have tried to address the root cause analysis problem by designing new detection methods with features that facilitate either identification (X. Li, F. Bian, M. Crovella, C. Diot, R. Govindan, G. Iannaccone, and A. Lakhina, "*Detection and identification of network anomalies using sketch subspaces*", in Proceedings of IMC, October 2006 and F. Silveira, C. Diot, N. Taft, and R. Govindan, "*Detecting correlated anomalous flows*", Thomson, Tech. Rep. CR-PRL-2009-02-0001, January 2009 or classification (A. Lakhina, M. Crovella, and C. Diot, "*Mining anomalies using traffic feature distributions*", in Proceedings of SIGCOMM, August 2005).

Lakhina et al. (A. Lakhina, M. Crovella, and C. Diot, "*Mining anomalies using traffic feature distributions*", in Proceedings of SIGCOMM, August 2005) proposed a method based on clustering of entropy residuals to classify the anomalies found by their PCA anomaly detector. Since these entropy residuals are an internal variable of the PCA detector, the main limitation of this approach is that it only classifies anomalies that are visible by PCA on entropy.

Li et al. (X. Li, F. Bian, M. Crovella, C. Diot, R. Govindan, G. Iannaccone, and A. Lakhina, "*Detection and identification of network anomalies using sketch subspaces*", in Proceedings of IMC, October 2006) combined PCA with traffic sketches to develop Defeat, a detector that can also identify the traffic involved in the anomalies. Their solution is also restricted to the PCA detector, and it requires a modification to the original detector's algorithm, i.e., the aggregation of traffic into k-ary sketches.

SUMMARY OF THE INVENTION

The present invention aims at solving the above-mentioned drawbacks of the prior art solutions.

In one aspect of the present invention, there is provided a method of identifying anomalous traffic including the steps of: (i) performing a detector function on traffic to determine whether the traffic contains an anomaly; (ii) if an anomaly is detected, dividing the traffic upon which the detector function has been performed into a plurality of sets; (iii) performing the detector function on each set to determine, for each set, whether the anomaly is present; and, (iv) if an anomaly is present in a set, dividing that set into a further plurality of sets, wherein steps (iii) and (iv) are each performed a plurality of times in an iterative manner.

Because steps (iii) and (iv) are performed in an iterative manner, that is, in a cycle such that the sets resulting from step (iv) are subsequently used in step (iii), the detector function is performed on a progressively smaller set of traffic at each cycle. As a result, one may progressively have a more accurate knowledge of the particular traffic in a stream of traffic that is responsible for the anomaly. That is, the set in which an anomaly is believed to be present may be narrowed, thereby helping to identify the anomalous traffic. It will be understood that the ability to narrow the set depends on the extent of the traffic in which the anomaly is present. There may be situations in which the anomaly is present in such a large proportion of the traffic that the set in which the anomaly is present is not narrowed.

Anomalous traffic may be characterized by the extent to which traffic, in particular traffic flows, in different time intervals is correlated. For example, a measure of the correlation may be obtained, and a threshold value may be used in relation to which traffic is determined to be anomalous. However, different anomaly detectors may use different criterion for determining traffic to be anomalous.

Advantageously, the present invention can be used with different anomaly detectors.

According to another aspect of the present invention, there is provided a method of identifying anonalous traffic in traffic containing a plurality of flows, each flow having a plurality of flow features, including the steps of: (i) dividing the traffic into a plurality of sets, on the basis a first flow feature, such that the flows in at least one of the sets have a common value for the first flow feature; (ii) determining that the anomaly is present in one of the sets; and, (iii) dividing the set in which the anomaly is present on the basis of a second flow feature, such that the flows in at least one of the resulting sets have a common value for the second flow feature.

According to yet another aspect of the present invention, there is provided apparatus for identifying anomalous traffic in traffic having a plurality of flows, each flow having a plurality of flow features, which flow features can each take a given value, the apparatus including: a memory stage for storing traffic; an anomaly detector stage arranged to detect an anomaly, if any, in the stored traffic; a processor stage operatively connected to the memory stage and the detector stage; the processor stage being arranged to (i) divide the traffic into a plurality of sets, on the basis of a first flow feature, such that the flows in at least one of the sets have a common value for the first flow feature, (ii) determine on the basis of an output from the detector stage, that the anomaly is present in one of the sets, and, (iii) divide the set in which the anomaly is present on the basis of a second flow feature, such that the flows in at least one of the resulting sets have a common value for the second flow feature.

In one embodiment, the there is provided a technique that automates traffic anomaly root cause analysis. It helps to narrow down the root cause traffic by analyzing the traffic in the anomalous time bins and iteratively removing flows that seem normal. Optionally, it classifies an anomaly by comparing its root cause traffic with traffic from previously classified anomalies.

The present invention can be viewed, as a method for detecting anomalies in a communication network by identifying root cause traffic by analyzing network traffic in anomalous time bins and iteratively removing flows that seem normal.

BRIEF DESCRIPTION OF THE DRAWINGS

The following detailed description will be better understood with the drawings, in which.

Figure 1:
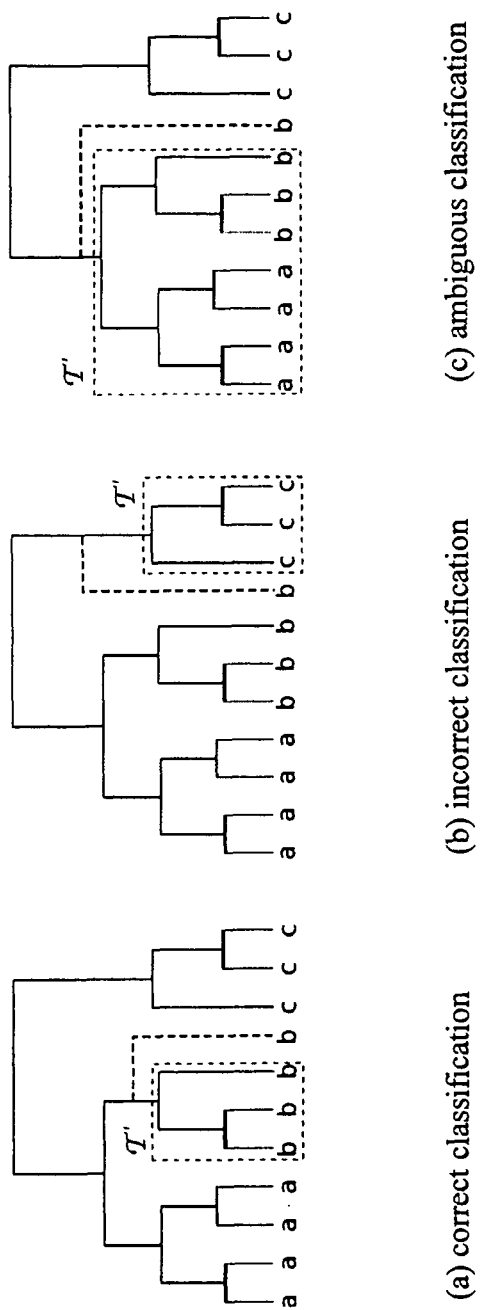
FIG. 1 shows an example of the three possible outcomes of a classification using the method according to the invention.

DETAILED DESCRIPTION OF THE
EMBODIMENTS OF THE INVENTION

Below are described the inputs required by the present invention and the different steps of the method according to the present invention.

Inputs

We consider that traffic traces are binned in fixed-size time intervals. Within each bin, packets that share the same 5-tuple information (i.e., IPs, ports, and transport protocol) are grouped into flows. In the n-th time bin, let $F_1, \ldots, F_n$ denote the sets of flows in each of the bins observed so far.

We represent the anomaly detector as a function $K(.)$ that receives as input the flows in the k+1 most recent bins, $F = \{F_{n-k}, \ldots, F_n\}$, and outputs a to non-negative score denoting how anomalous is the n-th bin. Finally, we let K' be the detection threshold used to flag a bin as anomalous. Namely, an alarm is flagged if and only if $K(.) > K'$.

For each flow, we record the following features:
1. source and destination IP addresses;
2. source and destination ports;
3. input and output router interfaces;
4. previous-hop and next-hop AS numbers; and
5. source and destination AS numbers.

We denote by $v_{fx}$ the value of feature x in flow f (e.g., a specific flow might have the value "80/TCP" for the feature "source port").

Identification Algorithm

The identification algorithm starts from the set of flows F used by the detector to compute the alarm and iteratively reduces it to smaller subsets, by discarding flows that seem normal to the detector function $K(.)$. Each iteration of our identification algorithm executes a procedure called partition-reduce. In short, this procedure:
1. inputs a flow feature x and a candidate set of flows A which contains the anomaly;
2. partitions A according to the different values of $v_{fx}$; and
3. returns a subset of A which is likely to still contain the whole anomaly.

Given a flow feature x and a set of flows A which contains the anomaly, we partition A into subsets $A_v$ containing the flows f whose feature value $v_{fx}$ equals v. Then, we re-compute the anomaly detection function, $K(.)$ on the complement of each $A_v$ with respect to F. We denote this value by $K^c_v$, for feature value v, and we assume without loss of generality that the n feature values are sorted such that $K^c_{v1} \leq K^c_{v2} \leq \ldots \leq K^c_{vn}$. Finally, we check if:
(a) $K^c_{v1} \leq K''$, for a chosen $K'' \leq K'$; and
(b) $K^c_{v2} > K'$.

The value of K" is a parameter called the normality threshold. When (a) and (b) are true, we reduce the original candidate set A to its subset $A_{v1}$. If either condition (a) or condition (b) does not hold, the partition-reduce procedure skips the reduction step and simply keeps A as the candidate set. The following pseudo-code summarizes the partition-reduce procedure.

The complement of a subset is the original (full) set minus everything which is in the subset. In other words, it's all the flows that do not have a particular feature (e.g., source IP) assuming a particular value (e.g., 10.0.0.1).

The utility of this is as follows: if we have many flows, and we need to find which ones among them are causing the problem, then all we need to do is pick a candidate (e.g., all flows with source IP 10.0.0.1), remove them from the original set of flows, and check if there is still a problem with the remaining flows. If, by removing a subset of flows, the problem disappears, we infer that the cause of the problem lies in these flows.

TABLE 1

Procedure 1 PARTITION-REDUCE($\mathcal{F}, \mathcal{A}$,p)

```
Input: F : the full set of flows
       A : the candidate set of flows
       x : a flow feature
Output: a new candidate set that is a subset of A
    V ← {v_fx | f ∈ A}
    for all v ∈ V do
        A_v ← {f | f ∈ A and v_fx = v}
        K_v^c ← K(F \ A_v)
    end for
    {Let K_v1^c ≤ K_v2^c ≤ ... ≤ K_vn^c}
    if K_v1^c ≤ K" and K_v2^c > K' then
        return A_v1
    else
        return A
    end if
```

In more detail, the steps in the partition reduced procedure set out in the pseudo code of table 1 uses the following inputs:
I1. The set of flows measured when the alarm was triggered—F.
I2. The set of candidate flows—A. On the first execution of the partition-reduce procedure, A is set to equal F.
I3. One flow feature—x.

The procedure also has three parameters (which are fixed across different executions of the procedure):
P1. The anomaly detector function—$K(.)$. This function transforms a set of flows X into a score K(X) which measures how anomalous the set of flows is.

P2. The abnormality threshold—K'. Whenever a set of flows X has a score K(X) above K', we say there is an anomaly in X.
P3. The normality threshold—K". Whenever a set of flows X has a score K(X) below K", we say the flows in X are all normal. It is always true that K" is smaller than K'.

The procedure outputs an updated set of candidate flows—A*.

For clarity purposes, the steps in the procedure set out in table 1 can be set out as containing the following steps:
Step 1. Determine the values for feature x in the candidate set A. Denote the set of determined values as V.
Step 2. For each feature value v in the set V, repeat the following three steps:
  Step 2.a. Compute the set of flows in A for which feature x has value v. Denote that set as A[v].
  Step 2.b. Compute the complement of set A(v) with respect to the full set of flows F. Denote that complement set as F-A[v].
  Step 2.c. Compute the score of the anomaly detection function K(.) for the complement set F-A(v). Denote that score as K[v].
Step 3. Sort the scores K[v], for all v, in increasingly order.
Step 4. Let v1 be the feature value with the smallest score K[v], for all v.
Step 5. If K[v1] is smaller than K" AND all other K[v]'s, for v different from v1 are greater than K', then set A* equal to A[v1].
Otherwise, set A* equal to A.

The above steps, which are directly derivable from the partition reduce procedure of table 1, can be illustrated with reference to, for example a set of IP addresses. In step 1, the different IP addresses are identified. At step 2, the set of flows with a given IP address is found, the complement of that set is computed (the compliment is used because the anomaly detector works better with many flows rather than just one), and the complement set is passed to the anomaly detector to such that the anomaly detector outputs a score indicative of the extent to which the complement set is anomalous. This is done for each IP address. The respective scores are then ordered. Steps 4 and 5 taken together effectively specify that (a) unless the flow associated with the lowest score (and therefore the most likely to be anomalous) is below a first threshold K" and (b) the respective scores of the other flows are above a second threshold K', then the cycle ends: that is, the set A is not updated. Consequently, it can be seen that the cycle ends if more than one set is determined to be anomalous. If more than one set is found to be anomalous, it is inferred that the anomaly it not to be narrowed to less than one set.

By using a first threshold and a second threshold that are not the same as one another, and determining that a flow is anomalous if its score is less than the first threshold and that it is normal if its score is above the second threshold reduces the likelihood of error. Clearly, the scores are able to take a range of values.

To understand the above procedure, it is helpful to consider the following example.

TABLE 2

| Flow | s.IP | d.IP | prot. | s.port | d.port |
|---|---|---|---|---|---|
| 1 | 10.0.0.1 | 10.0.0.2 | TCP | 80 | 1234 |
| 2 | 10.0.0.1 | 10.0.0.3 | UDP | 53 | 3333 |
| 3 | 10.0.0.2 | 10.0.0.4 | UDP | 21 | 4321 |

Table 2 lists the features values for flows labeled 1, 2, and 3. This set can itself be divided into two subsets according to source IP:
  flows with source IP 10.0.0.1, i.e., flows 1 and 2
  flows with source IP 10.0.0.2, i.e., flow 3
From table 2 above one can also infer that the same set could be divided differently, e.g., into three subsets according to destination IP.

To identify end host features (i.e., IPs and ports) we also exploit the fact that their values are hierarchically structured. By treating each bit of an IP address as a flow feature, we can use the partition-reduce procedure to discover, one bit at a time, the network prefix that contains all the anomalous hosts. Likewise, we can use the partition-reduce procedure with each bit of the port numbers to narrow down on the range of anomalous ports.

We define the hierarchical partition-reduce procedure as follows. Given a candidate set and a flow feature h with b bits, denoted $h_1, \ldots, h_b$, we execute the default partition-reduce procedure (Procedure 1 above) sequentially for each bit $h_i$, reducing the previous set $A_{i-1}$ to a subset $A_i$. We finish the loop after all bits of h have been discovered or, prematurely, if we find a bit for which the partition-reduce procedure can skip the reduction step. When identifying source or destination IPs with this procedure, we only update the candidate set if we can identify an IP prefix longer than /8.

The full identification algorithm consists of several iterations of the partition-reduce procedure, each with a different flow feature. The initial candidate set is F, and the output from each iteration becomes the candidate set for the next one. As a first phase, we run the partition-reduce procedure with the following features: input and output router interfaces, previous-hop and next-hop AS, and source and destination AS.

At the end of the first phase, we run the hierarchical partition-reduce procedure with the source IP and port, if and only if all flows in the candidate set share a single source AS. Likewise, we run the partition-reduce procedure with the destination IP and port, if all flows in the candidate set share a single destination AS.

The output of the identification algorithm is the set of flows involved in the anomaly Classification Algorithm We compute 22 metrics from the set of flows output by the identification algorithm. We use four types of coordinates:
1. the average flow size in packets;
2. the average packet size in bytes;
3. for each of the 10 flow features, the entropy of the distribution of packets per feature value; and
4. for each of the 10 flow features, the fraction of feature values in the full link traffic that also appear in the identified anomalous traffic.

After computing these metric values for all anomalies in a dataset, we normalize them by their corresponding standard deviations.

The classification algorithm works as follows. Given a set of labeled anomalies L, and an unknown anomaly u, we cluster the points in L ☐{u} using a standard hierarchical clustering algorithm [7].

The clustering method inputs the coordinates of the anomalies and outputs a taxonomy tree T where each anomaly corresponds to a leaf. Then, we find the subtree T' that contains the siblings of u. If all the nodes in T' have a single label, we classify u with that same label. If there is more than one label in T' we consider that there is uncertainty about the true class of u. In that case, we leave it to the operator to choose which label in T' best describes the type of u.

FIG. 1 shows an example of the three possible outcomes of a classification. Consider we have 10 labeled anomalies of three known types (labeled a, b and c in the figure), and we cluster them together with a new anomaly (shown as the dotted branch in the tree). Suppose that the new anomaly is of type b, but that is not known in advance. The leftmost tree shows a correct classification, i.e., the sub tree T' of siblings of the new anomaly contains only nodes of type b. In the middle tree, since all nodes in T' have type c, our algorithm would misclassify the new anomaly as type c. The rightmost tree shows an example of ambiguous classification because T' contains both a and b nodes. In the next section, we evaluate our classification algorithm by measuring how often a classification results in each of these outcomes.

Figure 2:
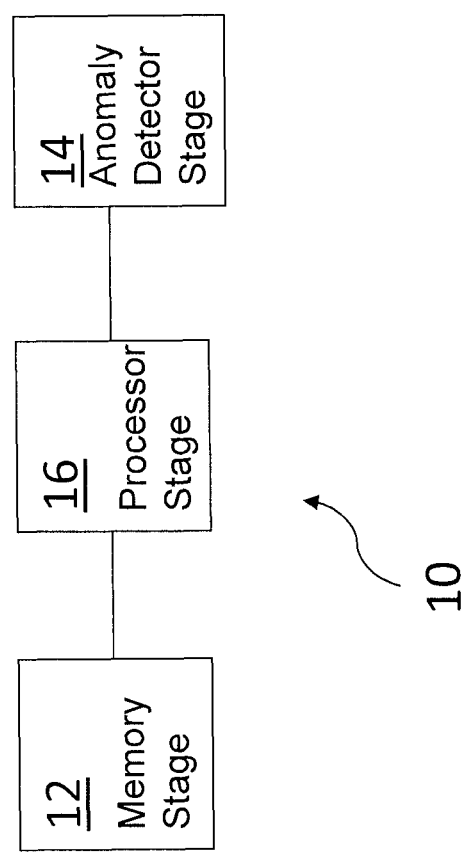
FIG. 2 schematically shows apparatus for detecting an anomaly in traffic

Returning to the identification of anomalous traffic, FIG. 2 shows apparatus 10 for determining traffic for an anomaly in a stream of traffic. The apparatus has a memory stage 12 for storing traffic flowing along a link in a network and an anomaly detector stage 14 for detecting an anomaly, if any, in the stored traffic. A processor stage 16 is operatively connected to the memory stage and the detector stage 12, the processor stage 16 being arranged to pass data to and from the memory stage, and to feed stored data to the anomaly detector stage 12. The anomaly detector stage 12 is arranged to generate a signal received by the processing stage if the data fed to the detector stage contains an anomaly. In particular, the processor stage 16 is arranged to read the data indicative of the flow features in the stored traffic, and divide the stored traffic into a plurality of sets on the basis of a chosen one of the flow features. The resulting sets each have a common value for the chosen flow feature. Each set is then passed to the detector stage. On the basis of a signal (or the absence of a signal) from the detector stage, the processor stage 16 determines whether an anomaly is present in each set. If an anomaly is present in more than one set, the procedure is halted.

However, if the anomaly is found in only one of the sets, the set in which it is found is divided by the processing stage 16 on the basis of a different flow feature. That is, the resulting sets each have a common value for this different flow feature. Again, each set is fed by the processing stage 16 to the anomaly detector stage 14 to determine whether that set contains the anomaly. As before, the procedure is halted if the anomaly is found to be present in more than one set. If the anomaly is present in only one set, that set is again divided, but now with respect to yet another flow feature. The process is repeated by the processing stage for each flow feature until (a) all the available flow features have been used or (b) it is determined that the anomaly is present in more than one set, whichever of (c) and (b) occurs first.

In this way, the accuracy with which the flow or flows containing the anomaly are identified is improved over what the accuracy would be without the above described apparatus.

The memory stage 12, anomaly detector stage 14 and the processor stage 16 will normally be implemented in one or more hardware devices (not shown) having a memory facility and a processor facility.

In more detail, the anomaly detector stage is a software device that inputs traffic measurements and outputs alarms. Stored records of the data packets that have been transmitted over a network link for some duration of time in the past, e.g., copies of all packets captured from a home user's DSL link between 4 pm and 5 pm on Mar. 15, 2010 are kept in the memory stage. An alarm having a binary value (i.e., yes or no) that denotes if the traffic measurements contain an anomaly is produced by the anomaly detector stage. An anomaly is an unusual event which can negatively impact a user's performance, e.g., a DoS attack, congestion, a network failure.

There are several different known anomaly detectors based on, e.g., identifying spikes in the instantaneous link traffic rate (i.e., the number of packets per second), looking for statistically rare byte sequences in packet headers. One anomaly detection approach is based on the model which distributes traffic measurements in fixed-size time intervals (e.g., of 5 minutes) and flags an alarm for a time interval, if the traffic flows in said time interval are strongly correlated to each other (which characterizes an anomaly). In order to determine if traffic flows are strongly correlated, anomaly detector uses the following procedure:

1—Distribute traffic measurements in fixed-size time intervals
2—For each time interval, do:
   2.1—For each traffic flow in the current time interval, compute the change in the number of packets within the flow for the current time interval, with respect to the previous time interval. Denote that change as delta (i, f) for time interval i and flow f.
   2.2—Compute the average of delta(i, f) across the different flows f in time interval i. Denote that average as A.
   2.3—Compute the variance of delta(i, f) across the different flows f in time interval i. Denote that variance as V.
   2.4—Compute the number of different flows f in time interval i. Denote that number as F.
   2.5—Compute the score given by the formula: Score=A/sqrt(V/F).
   2.6—If the score is greater in absolute value than a pre-determined threshold T, the current time interval contains an anomaly.

Otherwise, it does not.

The following additional information is provided.

1 INTRODUCTION

Several traffic anomaly detection methods have been proposed, and some techniques are now part of commercial products. These methods have in common the ability to flag alarms for a variety of events that may be important to a network operations center (NOC) including abuse traffic, flash crowds, and routing outages. Root cause analysis is usually left to network operators, who use their knowledge and intuition to analyze the traffic trace where the anomaly was flagged in search of events that can explain the anomaly. This manual process is both time-consuming and error prone. In a large ISP network with hundreds of links, the number of events that can trigger alarms may easily overload the NOC. Under such circumstances, the operator is likely to ignore alarms or never even deploy the detection system in the first place.

We introduce URCA, a tool that automates traffic anomaly root cause analysis. URCA operates in two steps. First, it identifies the root cause traffic by analyzing the traffic in the anomalous time bins and iteratively removing flows that seem normal. It uses feedback from the anomaly detector in order to determine which flows are more likely to be unaffected by the anomaly. While our identification method uses input from the anomaly detector, it can be used with existing techniques.

Having isolated the anomalous traffic, we build a graph representation of these flows which characterizes the type of root cause event. Our classification algorithm then clusters the graph representations of previously labeled events, and builds a taxonomy tree where similar anomalies are nested in subtrees. We use this fact to develop a scheme that classifies new anomalies without knowing the number of clusters in the dataset. This is important since operators cannot tell in advance how many types of anomalies happen in their networks.

Although our flow identification step uses the anomaly detector in its loop, URCA can be used with different anomaly detectors.

2 URCA AND ANOMALY DETECTORS

We analyze how events trigger anomalies and we specify the inputs required by URCA from detectors. We also define notation that we use to present our algorithms (Section 4).

2.1 The Root Cause Analysis Problem

The relationship between anomalies and their causes: a root cause event impacts a subset of the traffic flows. The corresponding change in the total traffic then triggers an alarm in a given anomaly detector. Root cause analysis is the process that can include trying to revert the causal chain, going from the alarm to the anomalous traffic and from this traffic to the root cause event. URCA has an algorithm for each step of root cause analysis process: (1) identifying the flows whose change has triggered the anomaly, and (2) classifying the root cause event from the characteristics of the identified flows.

In the case of identification, it is useful to efficiently narrow down the flows that could have triggered the anomaly. Suppose that, when a given detector flags an alarm, there are F traffic flows in the link. Without any assumptions on what could have caused the anomaly, we have to inspect $2^F$ subsets of flows, which may be infeasible even for a few thousands flows. On the other hand, with classification there can be a lack of information about events. While in identification we still have a trace of flows that is used to compute the alarm, in classification, there are no records of the events that generated these flows. Although some events may have been recorded in some places (e.g., routing changes in BGP/IGP traces) this information is normally scattered across different networks, and it is always easy to collect it every time an alarm is flagged.

2.2 URCA's Input from the Anomaly Detection Method

We consider that traffic traces are binned in fixed-size time intervals. Within each bin, packets that share the same 5-tuple information (i.e., IPs, ports, and transport protocol) are grouped into flows. In the n-th time bin, let $\mathcal{F}_1, \ldots, \mathcal{F}_n$ denote the sets of flows in each of the bins observed so far. We represent the anomaly detector as a function $K(\bullet)$ that receives as input the flows in the k+1 most recent bins, $\mathcal{F} = \{\mathcal{F}_{n-k}, \ldots, \mathcal{F}_n\}$, and outputs a non-negative score denoting how anomalous is the n-th bin. Finally, we let K' be the detection threshold used to flag a bin as anomalous. Namely, an alarm is flagged if and only if $K(\mathcal{F}) > K'$.

In order to make the identification problem tractable, URCA uses two inputs from the detector: (1) the set of flows $\mathcal{F}$ used by the detector to compute the alarm, and (2) the detector function $K(\bullet)$. Since the alarm is a function of $\mathcal{F}$, this set contains the flows involved in the root cause event. This is important for our identification algorithm which starts from $\mathcal{F}$ and iteratively narrows it down by eliminating normal flows. URCA uses the detector function $K(\bullet)$ to decide which flows seem normal. However, we treat this function as a "black box", making no assumptions about its form. This is important because different anomaly detectors use different functions $K(\bullet)$.

For the one anomaly detector, $\mathcal{F}$ corresponds to the flows in the two most recent bins in the link being measured (i.e., k=2).

3 EXPERIMENTAL DATA

3.1 Anomaly Datasets

We analyzed URCA using six backbone traffic traces collected on routers in the GEANT2 backbone. GEANT2 interconnects European NRENs (National Research and Education Networks) and provides them access to the commercial Internet as well as to other research networks worldwide.

We detected anomalies an ASTUTE detector. We divided the traffic in fixed sized time bins and compute the number of packets per 5-tuple flow. ASTUTE receives a pair of consecutive bins as input and decides if these bins contain an anomaly.

ASTUTE has two parameters: (1) the binning interval, and (2) the detection threshold. In one trace, we use a binning period of five minutes to obtain the same set of anomalies analyzed. In all other traces, we use a binning period of one minute to look for events at finer time scales. Using smaller time bins increases the number of alarms triggered per day. Still, our rationale is that in a real deployment, URCA would enable operators to run anomaly detectors at such fine time scales, since most of the alarms are going to be analyzed automatically. We flag the anomalous bins using a threshold value K'=6.

3.2 Flow Features

URCA uses flow features to identify and classify the anomalous traffic. Specifically, we consider the following features: (1) source and destination IP addresses; (2) source and destination ports; (3) input and output router interfaces; (4) previous-hop and next-hop AS numbers; and (5) source and destination AS numbers. Note that, while features (1) and (2) describe a flow's end hosts, features (3), (4), and (5) describe the network path taken by the flow. We use this distinction in our flow identification algorithm in Section 4.1.

Flow features (1)-(4) can be obtained directly from our flow traces. To obtain the source and destination network AS numbers, we need a map between IP prefixes and the ASes that own those prefixes. We build this IP-to-ASN map using publicly available data from UCLA's IRL and the whois service maintained by Team Cymru.

These databases tell us the ASes where a given IP is located. Note that, once bootstrapped, this mapping should remain largely consistent for long periods of time, since we do not expect large and sudden changes in IP space allocation. In this example, we take a single snapshot of the prefix-to-AS mapping and assume it does not change over the duration of our traces. In a real deployment of URCA, we could drop this assumption and keep the mapping up-to-date by receiving updates from systems such as Cyclops, which tracks changes in prefix advertisements seen by hundreds of vantage points across the Internet.

4 ALGORITHMS FOR URCA

In this Section we present our algorithms to identify flows involved in an anomaly and then classify the anomaly's root cause event.

4.1 Identification

Let $\mathcal{F}$ be the set of flows in the link between two consecutive bins. When an alarm is triggered, we have $K(\mathcal{F}) > K'$ and one task is to identify the subset of flows $\mathcal{A} \subseteq \mathcal{F}$ that are involved in the anomaly.

Our identification algorithm starts from the set of flows $\mathcal{F}$ used by the detector to compute the alarm and iteratively reduces it to smaller subsets, by discarding flows that seem normal to the detector function K(•). We consider only subsets where all flows share a value for some flow feature. Recall from Section 3.2 that each flow in $\mathcal{F}$ is characterized by features. We denote by $v_{fx}$ the value of feature x in flow f (e.g., a specific flow might have the value "80/TCP" for the feature "source port").

Each iteration of our algorithm executes a procedure called partition-reduce. In short, this procedure (1) inputs a flow feature x (Section 3.2) and a candidate set of flows $\mathcal{A}$ which contains the anomaly, (2) partitions $\mathcal{A}$ according to the different values of $v_{fx}$, and (3) returns a subset of $\mathcal{A}$ which is likely to still contain the whole anomaly.

Put formally, given a flow feature x and a set of flows $\mathcal{A}$ which is assumed to contain the anomaly, we partition $\mathcal{A}$ into subsets $\mathcal{A}_v$ containing the flows f whose feature value $v_{fx}$ equals v. Then, we need to determine if one of the $\mathcal{A}_v$ appears to contain the whole anomaly. We re-compute the anomaly detection function, K(•) on the complement of each $\mathcal{A}_v$ with respect to $\mathcal{F}$. We denote this value by $K_v^c$, for feature value v, and we assume without loss of generality that the n feature values are sorted such that $K_{v_1}^c \leq K_{v_2}^c \leq \ldots \leq K_{v_n}^c$. Finally, we check if (a) $K_{v_1}^c \leq K''$, for a chosen $K'' \leq K'$, and (b) $K_{v_2}^c > K'$. Note that K" is a parameter introduced by our algorithm. We call it the normality threshold, and its represents how low the anomaly score should be so that a set of flows can be considered normal. If K" is set too high (close to K'), our algorithm becomes aggressive in reducing the candidate set, and can wrongly discard some of the anomalous flows. If K" is very low (close to zero), the algorithm is conservative and may output more flows than only the anomalous ones. In our experiments, we set K"=3, i.e., 50% of the value of K'. We found this threshold value to work well in practice, by running URCA with several values of K" on trace A, for which we have manually identified flows and labels. We leave the automation of this calibration method for our future work.

Condition (a) above means that if we remove $\mathcal{A}_{v_1}$ from the link, the remaining traffic seems normal to the anomaly detector. Conversely, condition (b) implies that removing the flows of any other individual feature value does not affect the anomaly. When these two conditions are met, we have a strong indication that the anomalous flows share the value $v_1$ for feature x. Thus, we can reduce the original candidate set $\mathcal{A}$ to its subset $\mathcal{A}_{v_1}$. If either condition (a) or condition (b) does not hold, the partition-reduce procedure skips the reduction step and simply keeps $\mathcal{A}$ as the candidate set. In that case, we try to partition the candidate set using other flow features until all features have been analyzed. The procedure shows the pseudo-code description of the partition-reduce steps.

The identification algorithm has several iterations of the partition-reduce procedure, each with a different flow feature. The initial candidate set is $\mathcal{F}$, and the output from each iteration becomes the candidate set for the next one. As a first phase, we run the partition-reduce procedure with the network path features ordered by decreasing aggregation level: input and output router interfaces, previous-hop and next-hop AS, and source and destination AS. Note that the more a feature aggregates traffic, the fewer subsets it partitions the candidate set and, consequently, the faster is the partition-reduce iteration. Moreover, if in one iteration we narrow down, e.g., the output interface, we also reduce the number of next-hop ASes in the candidate set to only ASes that are reachable though this interface. Thus, by analyzing the features in decreasing order of aggregation, we remove larger amounts of traffic in early iterations and speed up the algorithm. At the end of this first phase, if the candidate flows come from more than one source AS, we do not try to identify the source host features, since the anomaly likely involves multiple hosts in different networks. Likewise, we do not try to identify destination host features if the candidate flows go to more than one destination AS.

To identify end host features (i.e., IPs and ports) we also exploit the fact that their values are hierarchically structured. For instance, consecutive IP addresses can be aggregated by their longest prefix. By treating each bit of an IP address as a flow feature, we can use the partition-reduce procedure to discover, one bit at a time, the network prefix that contains all the anomalous hosts. Likewise, application ports can be grouped in ranges of consecutive port numbers, e.g., ports in the range 0-1023 are usually assigned to well-known services. Again, we can use the partition-reduce procedure with each bit of the port numbers to narrow down on the precise range of anomalous ports. Note that this makes identification of IP addresses and ports faster since each bit partitions the candidate flows in at most two sets.

We formally define the hierarchical partition-reduce procedure as follows. Given a candidate set $\mathcal{A}_0$ and a flow feature h with b bits, denoted $h_1, \ldots, h_b$, we execute the default (non-hierarchical) partition-reduce procedure sequentially for each bit $h_i$, reducing the previous set $\mathcal{A}_{i-1}$ to a subset $\mathcal{A}_i \subseteq \mathcal{A}_{i-1}$. We finish the loop after all bits of h have been discovered or, prematurely, if we find a bit $h_i$ for which the partition-reduce procedure can skip the reduction step. When identifying source or destination IPs with this procedure, we only update the candidate set if we find an IP prefix longer than /8.

Note that, for a given anomaly, our identification algorithm runs at most 10 iterations of the partition-reduce procedure, i.e., one for each flow feature. In our traces, our identification algorithm analyzes over 50% of the anomalies in 5 iterations or less, and over 98% in 7 or less iterations.

4.2 Classification (Optional)

After identifying the anomalous flows, we can optionally infer the event that caused it. Our approach is to look for patterns in the set of anomalous flows.

We expect that flows impacted by similar types of events will produce similar graph structures. Under that assumption, we can build a taxonomy of anomaly root causes using hierarchical clustering. Note that we could have used other clustering techniques such as k-means, or a different classification approach like k-nearest neighbors. However, these techniques would introduce additional parameters into URCA, i.e., the number of clusters in k-means or the neighborhood size in k-nearest neighbors. Hierarchical clustering allows us to develop a simple classification scheme which does not depend on extra parameters, as we show next.

In order to cluster anomaly root causes, we first map each root cause as a point in a space where the distance between two points reflects their dissimilarity. We use four types of coordinates: (1) the average flow size in packets; (2) the average packet size in bytes; (3) for each of the 10 flow features, the entropy of the distribution of packets per feature value; and (4) for each of the 10 flow features, the fraction of feature values in the full link traffic that also appear in the root cause traffic. Coordinates of types (1)-(3) represent the structure of the root cause flows, while coordinates of type four (4) reflects how much of the total link traffic is impacted by the root cause event. Note that each of the 22 coordinates described above may have completely different scales. Given a set of root causes we want to cluster, we first normalize all the coordinate values by their corresponding standard deviations. This puts all the coordinates in equal scales and avoids a distance metric that gives more importance to the coordinates with higher variance.

Our classification algorithm works as follows. Given a set of labeled root causes $\mathcal{L}$, and an unknown anomaly u, we cluster the points in $\mathcal{L} \cup \{u\}$ using hierarchical clustering. The clustering method inputs the coordinates of the anomalies and outputs a taxonomy tree $\mathcal{T}$ where each anomaly corresponds to a leaf. Then, we find the subtree $\mathcal{T}$ that contains the siblings of u. If all the nodes in $\mathcal{T}$ have a single label, we classify u with that same label. If there is more than one label in $\mathcal{T}$ we consider that there is uncertainty about the true class of u. In that case, we leave it to the operator to choose which label in $\mathcal{T}$ best describes the type of u.

FIG. 1 shows an example with the three possible outcomes of a classification. Consider we have 10 labeled anomalies of three known types (labeled a, b and c in the Figure), and we cluster them together with a new anomaly (shown as the dotted branch in the tree). Suppose that the new anomaly is of type b, but that is not known in advance. FIG. 1 shows a correct classification, i.e., the subtree $\mathcal{T}$ of siblings of the new anomaly contains only nodes of type b. In FIG. 1 since all nodes in $\mathcal{T}$ have type c, our algorithm would misclassify the new anomaly as type c. Figure shows an example of ambiguous classification because $\mathcal{T}$ contains both a and b nodes. In the next section, we evaluate our classification algorithm by measuring how often a classification results in each of these outcomes.

The above specification, examples and drawings provide a description of the method and apparatus according to the present invention. Since many embodiments of the invention can be made without departing from the spirit and scope of the invention, the invention resides in the claims herein after appended.

The invention claimed is:

1. A method of identifying anomalous network traffic, the traffic containing a plurality of data units that each have at least one feature with an associated value, the method comprising:
(i) performing a detector function on the network traffic to determine whether the network traffic contains an anomaly;
(ii) if an anomaly is detected, storing a predetermined amount of the network traffic including the anomalous network traffic, and dividing the stored predetermined amount of network traffic into a plurality of sets, the traffic being divided in dependence on the value of one or more of the at least one feature;
(iii) performing the detector function on each one of the plurality of sets for determining, for each set, whether the anomaly is present, said determining, for each set, further comprises associating a score with that set, which score is indicative of the extent to which that set is considered anomalous, that set being considered to be anomalous by comparing the score with a first threshold and the score is above the first threshold, and to be normal by comparing the score with a second threshold different from the first threshold and the score is below the second threshold;
(iv) if an anomaly is present in a set, dividing that set into a further plurality of sets,
wherein steps (iii) and (iv) are each performed a plurality of times in an iterative manner;
wherein terminating the method when step (iv) has been performed in respect of each at least one feature or when the anomaly is detected to be present in each of the sets resulting from step (iii); and
classifying the anomaly in each of the sets according to the type of network event that caused the anomaly.

2. The method as claimed in claim 1, wherein traffic contains data units, each data unit having a plurality of features, which features can each take a given value, and wherein step (iv) is performed in respect of a first feature and is subsequently performed in respect of a second feature.

3. The method as claimed in claim 1, wherein traffic is divided in dependence on a feature such that of the resulting sets, at least one of the sets contains data units having a common value for that flow feature.

4. The method as claimed in claim 1, wherein the value of the at least one feature is carried by the associated data unit.

5. The method of claim 1, wherein traffic is divided in dependence on one or more of: a source address; a destination address; a source port; a destination port; an input router interface identifier; an output router interface identifier; a previous-hop network identifier; a next-hop network identifier; a source network identifier; and, a destination network identifier.

6. The method as claimed in claim 1, wherein the traffic over a time interval is stored.

7. The method as claimed in claim 1, wherein steps (i) to (v) are performed in respect of traffic stored at a plurality of time intervals.

8. The method as claimed in claim 7, wherein the time intervals are of equal duration.

9. The method as claimed in claim 1, wherein traffic is divided in dependence on one or more of: a source address; a destination address; a source port; a destination port; an input router interface identifier; an output router interface identifier; a previous-hop network identifier; a next-hop network identifier; a source network identifier; the transmission protocol, and, a destination network identifier.

10. A method of determining traffic responsible for an anomaly in traffic containing a plurality of flows, each flow having a plurality of flow features, the method comprising:
(i) dividing the traffic into a plurality of sets, on the basis a first flow feature, such that the flows in at least one of the sets have a common value for the first flow feature;
(ii) determining whether the anomaly is present in one of the sets, if an anomaly is detected storing a predetermined amount of the network traffic including the anomalous network traffic, said determining, for each set, further comprises associating a score with that set, which score is indicative of the extent to which that set is considered anomalous, that set being considered to be anomalous by comparing the score with a first threshold and the score is above the first threshold, and to be normal by comparing the score with a second threshold different from the first threshold and the score is below the second threshold; and
(iii) dividing the set in which the anomaly is present on the basis of a further flow feature, such that the flows in at least one of the resulting sets have a common value for the further flow feature,
wherein repeating steps (ii) and (iii) until these steps have been performed in respect of each available flow feature, or until it is determined that the anomaly is present in a plurality of the sets resulting from step (ii); and
classifying the anomaly in each of the sets according to the type of network event that caused the anomaly.

11. The method as claimed in claim 10, wherein steps (ii) and (iii) are repeated on the basis of a third flow feature.

12. The method as claimed in claim 10, wherein in step (ii) the anomaly is determined by inference to be present in one of the sets by performing an analysis of traffic outside that set.

13. The method as claimed in claim 10, wherein a flow feature is an identifier expressible as a sequence of bits arranged in order of significance, and wherein the method includes the steps of: dividing the traffic in dependence on the bit value of the most significant bit so as to form a plurality of sets; determining that the anomaly is present in one of the sets; further dividing the set in which the anomaly is present according to the bit value of the next significant bit.

14. The method as claimed in claim 13, including the further step of iteratively dividing a set according to progressively less significant bit values until the sequence of bits has been obtained.

15. A network traffic analyzing apparatus for identifying anomalous traffic in traffic, the traffic having a plurality of flows, each flow having a plurality of flow features, which flow features can each take a given value, the apparatus comprising:
- a memory stage for storing network traffic;
- an anomaly detector stage configured to detect an anomaly, if any, in the stored traffic; and
- processor stage operatively connected to the memory stage and the detector stage; the processor stage being configured to:
  (i) divide the traffic into a plurality of sets, on the basis a first flow feature, such that the flows in at least one of the sets have a common value for the first flow feature,
  (ii) determine on the basis of an output from the detector stage, that the anomaly is present in one of the sets, said determining, for each set, further comprises associating a score with that set, which score is indicative of the extent to which that set is considered anomalous, that set being considered to be anomalous by comparing the score with a first threshold and the score is above the first threshold, and to be normal by comparing the score with a second threshold different from the first threshold and the score is below the second threshold,
  (iii) divide the set in which the anomaly is present on the basis of a further flow feature, such that the flows in at least one of the resulting sets have a common value for the second flow feature,
- wherein steps (ii) and (iii) are repeated until these have been performed in respect of each available flow feature, or until it is terminated that the anomaly is present in a plurality of the sets resulting from step (ii), and
- classifying the anomaly in each of the sets according to the type of network event that caused the anomaly.

* * * * *